United States Patent
Elfert et al.

(10) Patent No.: US 12,332,272 B2
(45) Date of Patent: Jun. 17, 2025

(54) ROLLING BEARING HAVING POSITION-DETERMINING DEVICE

(71) Applicants: thyssenkrupp rothe erde Germany GmbH, Dortmund (DE); thyssenkrupp AG, Essen (DE)

(72) Inventors: Gunther Elfert, Erwitte (DE); Bernd Stakemeier, Erwitte (DE)

(73) Assignees: thyssenkrupp rothe erde Germany GmbH, Dortmund (DE); thyssenkrupp AG, Essen (DE)

(*) Notice: Subject to any disclaimer, the term of this patent is extended or adjusted under 35 U.S.C. 154(b) by 429 days.

(21) Appl. No.: 17/790,605

(22) PCT Filed: Dec. 16, 2020

(86) PCT No.: PCT/EP2020/086344
§ 371 (c)(1),
(2) Date: Jul. 1, 2022

(87) PCT Pub. No.: WO2021/136659
PCT Pub. Date: Jul. 8, 2021

(65) Prior Publication Data
US 2023/0068372 A1 Mar. 2, 2023

(30) Foreign Application Priority Data
Jan. 3, 2020 (DE) .................... 10 2020 200 032.8

(51) Int. Cl.
*G01P 3/44* (2006.01)
*F16C 41/00* (2006.01)
(Continued)

(52) U.S. Cl.
CPC ............ *G01P 3/443* (2013.01); *F16C 41/007* (2013.01); *G01D 5/202* (2013.01); *G01D 11/02* (2013.01);
(Continued)

(58) Field of Classification Search
CPC ............... F16C 19/381; F16C 2233/00; F16C 2360/31; F16C 41/007; F16C 43/04; G01D 11/02; G01D 5/202; G01P 3/443
See application file for complete search history.

(56) References Cited

U.S. PATENT DOCUMENTS

| 4,764,015 A | 8/1988 | Bieringer et al. |
| 6,522,379 B1 | 2/2003 | Ishihara et al. |
| (Continued) | | |

FOREIGN PATENT DOCUMENTS

| CN | 1615407 A | 5/2005 |
| CN | 101501455 A | 8/2009 |
| (Continued) | | |

OTHER PUBLICATIONS

Michael Sweeney et al., Design considerations for optical pointing and scanning mechanisms, Proc. SPIE 5176, Optomechanics (2003).
(Continued)

*Primary Examiner* — David L Singer
(74) *Attorney, Agent, or Firm* — thyssenkrupp North America, LLC

(57) ABSTRACT

A rolling bearing may have at least two bearing rings arranged rotatably relative to each other, at least one row of rolling elements arranged such that they can roll between the bearing rings, and a position-determining device for determining an absolute angular position of the bearing rings relative to each other. The position-determining device includes field patterns that are arranged on a surface of a first of the bearing rings and distributed around a circumference thereof, with fields of the field patterns having field heights with discrete values. The position-determining device also includes at least one eddy current sensor that is provided on a second of the bearing rings to scan the field patterns. An evaluation device may be configured to assign an associated angular position signal, which describes the absolute angular (Continued)

position of the first and second bearing rings relative to each other, to a scan of each field pattern.

10 Claims, 2 Drawing Sheets

(51) Int. Cl.
  *G01D 5/20* (2006.01)
  *G01D 11/02* (2006.01)
  *F16C 19/38* (2006.01)
(52) U.S. Cl.
  CPC ........ *F16C 19/381* (2013.01); *F16C 2233/00* (2013.01)

(56) References Cited

U.S. PATENT DOCUMENTS

| | | | |
|---|---|---|---|
| 2005/0031239 A1 | 2/2005 | Aoki et al. | |
| 2005/0089253 A1* | 4/2005 | Koike | G01P 3/443 384/448 |
| 2005/0093498 A1 | 5/2005 | Hill | |
| 2008/0044119 A1 | 2/2008 | Aoki et al. | |
| 2010/0142076 A1 | 6/2010 | Bandic et al. | |
| 2010/0156402 A1* | 6/2010 | Straubinger | G01D 5/2225 324/207.25 |
| 2011/0026155 A1 | 2/2011 | Bandic et al. | |
| 2011/0044561 A1 | 2/2011 | Braunecker et al. | |
| 2011/0315864 A1 | 12/2011 | Lippuner | |
| 2012/0175983 A1 | 7/2012 | Rink | |
| 2016/0258786 A1 | 9/2016 | Fritsch et al. | |
| 2017/0328737 A1 | 11/2017 | Sen et al. | |
| 2019/0195278 A1 | 6/2019 | Elfert et al. | |
| 2019/0219422 A1 | 7/2019 | Weis et al. | |
| 2020/0249104 A1 | 8/2020 | Murakami et al. | |
| 2021/0156717 A1* | 5/2021 | Bühler | G01D 5/2046 |
| 2023/0126952 A1 | 4/2023 | Murakami et al. | |

FOREIGN PATENT DOCUMENTS

| | | | | |
|---|---|---|---|---|
| CN | 101573537 A | | 11/2009 | |
| CN | 101751930 A | | 6/2010 | |
| CN | 102741575 A | | 10/2012 | |
| CN | 105937918 A | | 9/2016 | |
| CN | 107250731 A | | 10/2017 | |
| CN | 108474416 A | | 8/2018 | |
| CN | 109690097 A | | 4/2019 | |
| CN | 110030924 A | | 7/2019 | |
| CN | 110337549 A | | 10/2019 | |
| DE | 10105824 A1 | * | 8/2002 | ............. B62D 1/16 |
| DE | 10 2004 050 999 A1 | | 6/2005 | |
| DE | 102013226516 A1 | * | 7/2015 | ............. F16H 63/30 |
| DE | 10 2016 223 884 A1 | | 6/2018 | |
| EP | 1 447 579 A1 | | 8/2004 | |
| EP | 1 526 362 B1 | | 4/2005 | |
| EP | 1 528 356 A2 | | 5/2005 | |
| JP | 2003-005189 A | | 1/2003 | |
| JP | 2006010366 A | * | 1/2006 | ............. G01D 5/245 |
| JP | 2006 029517 A | | 2/2006 | |
| JP | 2019-164128 A | | 9/2019 | |
| WO | 2008/081761 A1 | | 7/2008 | |
| WO | 2017/103117 A1 | | 6/2017 | |
| WO | WO-2018041702 A1 | * | 3/2018 | ............. F16C 19/18 |
| WO | 2018/099519 A1 | | 6/2018 | |
| WO | 2018/149431 A1 | | 8/2018 | |

OTHER PUBLICATIONS

Francois Dagry et al., Fracture Mechanics Assessment of Large Diameter Wind Turbine Bearings, Journal of Multiscale Modelling (2018).

Wang Zuobin, A 23-Bit Absolute opto-electric Axle-angle Encoder, J. Sensor & Transducer Techno, Changchun Institute of optics and Fine Mechanics (1992).

English Translation of International Search Report issued in PCT/EP2020/083644, dated Mar. 2, 2021.

* cited by examiner

ROLLING BEARING HAVING POSITION-DETERMINING DEVICE

CROSS REFERENCE TO RELATED APPLICATIONS

This application is a U.S. National Stage Entry of International Patent Application Serial Number PCT/EP2020/086344, filed Dec. 16, 2020, which claims priority to German Patent Application No. DE 10 2020 200 032.8, filed Jan. 3, 2020, the entire contents of both of which are incorporated herein by reference.

FIELD

The present disclosure generally relates to bearings, including rolling bearings that have a position-determining device.

BACKGROUND

In various applications of rolling bearings, it is desirable to be able to monitor an angular position set by the rolling bearing by means of a position-determining device in order to be able to control a position adjustment, for example. An example application is determining the position of an excavator structure that can be rotated in relation to the chassis. Other example applications can include crane systems or blade bearings of wind turbines.

A common form of position determination is that of incremental encoders that are either flanged directly to a drive motor for adjusting the rolling bearing or driven externally via a carrier pinion. Inside the encoder there is a graduated disc as a measurement standard, which is usually scanned optically. Typical resolutions are, for example, 200-400 graduations per revolution. Pulse counters are also known, which are based on a digital scanning of pulse marks with inductive proximity switches.

In addition to these position-determining devices provided on the drive side outside a rolling bearing, EP 1 526 362 B1, for example, also discloses a rolling bearing which contains a built-in absolute encoder. In the case of absolute encoders that scan a magnetic characteristic which varies sinusoidally, for example, there is a trade-off between the achievable measurement accuracy and the size of the detectable measurement range. In order to resolve this conflict, in EP 1 526 362 B1 a magnetic characteristic that is steeper than a sinusoidal on one rolling bearing ring is scanned with at least two magnetic sensors arranged on the other rolling bearing ring, offset in the circumferential direction. The disadvantage of this position-determining device is that the measurement data scanned for the position determination are distorted under the influence of external magnetic fields or also due to aging-related demagnetization of the characteristic, and thus inaccurate and unreliable position values are delivered.

Thus a need exists for a rolling bearing with a position-determining device in which the absolute angle of rotation of the rolling bearing can be reliably and accurately determined, even in harsh environmental conditions.

DETAILED DESCRIPTION

Figure 1:
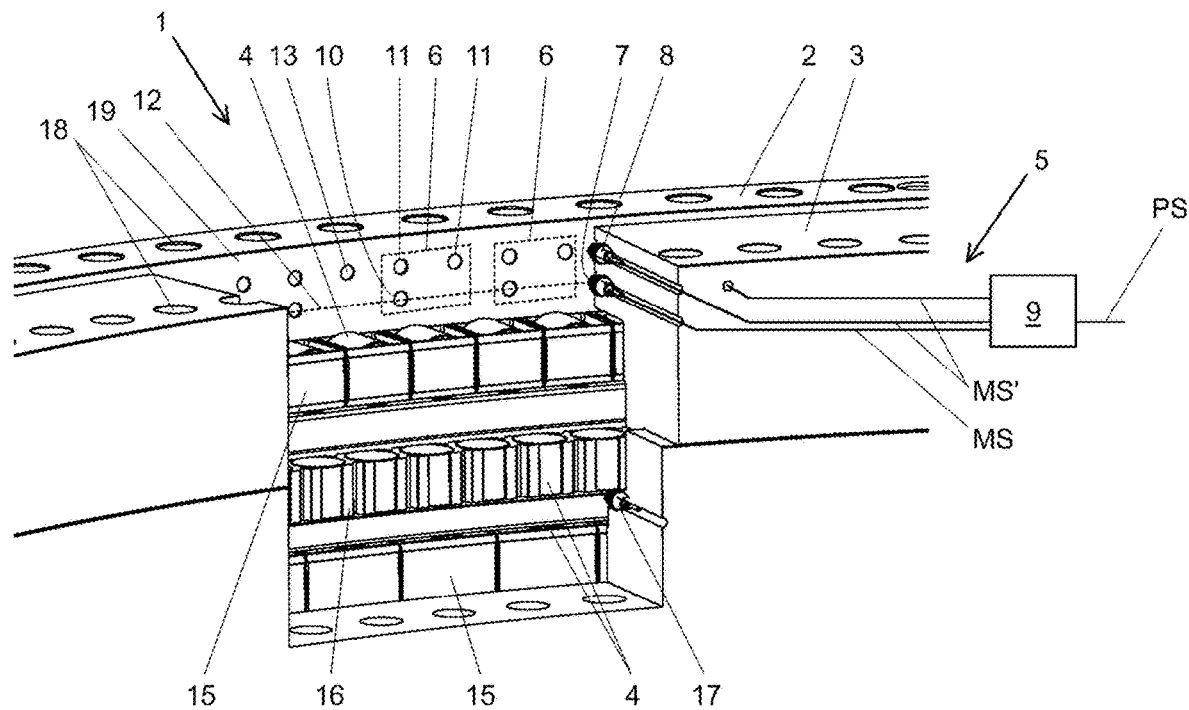
FIG. 1 is a schematic, perspective view of a first exemplary embodiment of a rolling bearing.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a rolling bearing may include at least two bearing rings that are arranged rotatably relative to each other, at least one row of rolling elements arranged such that they can roll between the bearing rings, and a position-determining device for determining an absolute angular position of the bearing rings. The position-determining device comprises field patterns, arranged on a surface of a first of the bearing rings and distributed over the circumference thereof, the fields 5 of which have field heights with discrete values. The position-determining device also comprises at least one eddy current sensor arranged on a second of the bearing rings in order to scan the field patterns, and an evaluation device. The evaluation device is configured to assign an associated angular position signal, which describes the absolute angular position of the bearing rings relative to each other, to the scan of each of the field patterns.

The position-determining device according to the invention is integrated into the rolling bearing. The position-determining device is thus mechanically protected by the material of the rolling bearing rings, especially in harsh environmental conditions. For example, the rolling bearing rings are produced from rolling bearing steel. By scanning field patterns using eddy current sensors, the position-determining device is also based on a measuring principle that is insensitive to grease or oil lubrication, such as can be used in the interior of the rolling bearing. By using field patterns with discrete-valued field heights, discretely different measurement signals are generated depending on the particular field height being scanned, which permit a unique assignment of the associated angular position signal. The position-determining system according to the invention is thus insensitive to external interference and aging effects.

Due to the unique assignment of an associated angular position signal to each of the field patterns, the absolute angular position of the rolling bearing rings in relation to each other is known after scanning only one field pattern. The measuring principle used also allows a fast and reliable scanning of the field patterns, so that the current angular position can be determined continuously even during rotation speeds of more than 10 rpm, regardless of the direction of rotation.

A field pattern in the sense of the invention is a fixed arrangement of a predefined number of fields. The same arrangement of the fields in each field pattern means that the positions of the fields relative to each other are fixed in the field pattern.

The field patterns differ in the field height designated for each individual field. The field height at each of the field positions can assume a predefined number of discretely different values. The discrete set of values for the field height can include positive values and/or negative values. A field height of zero also explicitly falls within the scope of the invention. In the case of positive values of the field height, the fields are formed as elevations, and in the case of negative values as depressions in the surface. At a field height of zero, the field is at the level of the surface.

Preferably, the field heights of the fields comprise depressions and/or elevations in the surface. Particularly preferably, all fields of all field patterns are formed either as depressions or as elevations in the surface, particularly preferably including a field height of zero in each case. However, embodiments can also be envisaged in which elevations and depressions in the surface occur in combination in the field patterns.

Preferably, each field pattern contains at a specified position of the field pattern an index field, the field height of which differs from the surrounding surface. From the minimum deviation of the field height of the index fields from the surrounding surface, even such field patterns having additional fields with a field height of zero, at least in some areas, can be reliably detected.

Particularly preferably, the index fields are arranged on an index circle axially and/or radially separated from the other fields of the field pattern, and one of the eddy current sensors is dedicated to the index fields in such a way that it only passes over the index fields as the rolling bearing rings rotate. In this case, the evaluation of the measurement signals of an eddy current sensor dedicated to the index fields is sufficient to detect that there is an angular position in which a field pattern can be scanned. The evaluation device is therefore configured to specify an evaluation instant for a measurement signal of at least one further eddy-current sensor based on the evaluation of measurement signals of the eddy-current sensor dedicated to the index fields. In this way, the computational effort of the evaluation unit is advantageously reduced since only one measurement signal must be continuously evaluated.

Preferably, the field heights of the field patterns are selected from a set of values that includes at least three discrete values. This has the advantage that a larger number of different angular position values can be encoded for a given number of fields per field pattern compared to a binary system with similar functionality. A given accuracy of the position determination can therefore be achieved with a smaller space requirement in the rolling bearing. The number of discrete field height values is limited upwards by the resolution capability of the eddy current sensors used. In particularly preferred embodiments, the field heights of the field patterns are therefore selected from a set of values that contains 3 to 8 different discrete values.

The field patterns preferably comprise a predefined number of fields, each of which is assigned exactly one eddy current sensor for the scanning. Preferably, each field pattern comprises a fixed number of fields in the range of 2 to 5 fields. The 1:1 assignment of eddy current sensors to fields in the field patterns ensures that the entire field pattern can be scanned simultaneously. Therefore, it is not necessary to wait for an eddy current sensor to traverse multiple fields before an angular position signal can be output. This enables a fast measuring method that is insensitive to changes in direction of rotation.

Preferably, the fields of the field patterns have field areas that are larger than an active sensor surface of the at least one eddy current sensor. When the fields are traversed with the active sensor surface, a measurement value plateau is reached as long as the active sensor surface is located completely within the field area. The evaluation unit can uniquely identify the fields on the basis of a measurement value plateau reached. The fields can therefore be detected independently of the absolute value of the available measurements. However, embodiments can also be envisaged in which the field areas are smaller than or equal to the active sensor surface of the eddy current sensors. In this case, the field positions can be determined by means of extreme-value detection.

In advantageous embodiments, it may also be provided that the evaluation device is configured to use measurement values of the at least one eddy current sensor recorded outside of field patterns in determining the angular position signal, in order to compensate for load-dependent deformations of the bearing rings. The evaluation unit can detect measurement values recorded outside of field patterns on the basis of a measurement value plateau that corresponds to a minimum distance from the eddy current sensor. This minimum distance fluctuates to the same extent as the detected field heights depending on the load-dependent deformations of the bearing rings. The measurement values recorded outside of field patterns can thus be used by the evaluation device as an offset to apply load-dependent corrections to the measurement values recorded during the scanning of the field patterns.

If the fields are formed as depressions, they can be introduced directly into the bearing ring, for example as drilled blind holes with different field heights. However, it can also be provided that the field patterns are formed by at least one perforated sheet fixed to the first bearing ring. By placing a plurality of perforated plates on top of one another, field patterns with more than two different depths can also be realized by means of perforated sheets. Elevations can be formed, for example, by applying sheets of fixed thickness, preferably matching inserts.

FIG. 1 shows a rolling bearing 1 according to the invention in a perspective view in which, for the sole purpose of clarifying the invention, a section of one of the bearing rings has been cut out in order to make the inside of the bearing visible.

The rolling bearing 1 has two rotating bearing rings 2, 3 arranged rotatably relative to each other, as well as at least one row of rolling elements 4 arranged such that they can roll between the bearing rings 2, 3, and a position-determining device 5 for determining an absolute angular position of the bearing rings 2, 3 relative to each other.

A so-called three-row roller revolving connection is shown as an example, which has three rows of rolling elements 4—a row of supporting, radial, and retaining rollers. The rolling elements 4 can be separated from each other by window sections 15 or roller spacers 16. Alternatively, cages can also be used for this purpose. The rolling bearing 1 shown also comprises mounting holes 18 on both bearing rings 2, 3 to secure the bearing 1 to the connection structures of the components to be mounted. In addition to the position-determining device 5, the bearing can also contain additional sensors 17, for example for measuring wear or load.

The position-determining device 5 comprises field patterns 6 which are arranged on a surface 19 of a first bearing ring 2 of the bearing rings 2, 3 and distributed around the circumference thereof, the fields having field heights T0, T1, T2, T3, T4 with discrete values (see FIG. 3), at least one eddy current sensor 7, 8 which is arranged on a second bearing ring 3 in order to scan the field patterns 6, and an evaluation device 9. The evaluation device 9 is configured to assign an associated angular position signal PS, which describes the absolute angular position of the bearing rings 2, 3 relative to each other, to the scanning of each of the field patterns 6.

The angular position signal PS can be output by the evaluation device 9 as shown in FIG. 1. However, it is also possible to implement embodiments in which the evaluation device 9 temporality stores the angular position signals and determines, for example by forming a difference, and outputs a relative position signal which describes the relative rotation of the bearing in relation to a previous position of the bearing.

In the exemplary embodiment shown, the field patterns 6 comprise a specified number of fields, for example three, each of which is assigned exactly one eddy current sensor 7, 8 for the scanning. Fields 10, 11 of the field patterns 6 are formed as depressions in the surface 19, including a field height of zero. For example, the depressions may be formed by drilled holes. Other shapes, such as grooves, slots, or oval holes, can also be envisaged. The same applies to the shapes of possible elevations.

Each field pattern 6 contains at a specified position of the field pattern 6 a so-called index field 10, the field height of which is always non-zero. The index fields 10 are arranged on an index circle 12 axially separated from the other fields 11 of the field pattern 6. The eddy current sensor 7 dedicated to the index fields 10 therefore only traverses the index fields 10 when the rolling bearing rings 2 and 3 are rotating.

In alternative rolling bearing designs, it is also conceivable that the position measuring device is implemented in axially opposite surfaces of two rolling bearing rings. In this case, the index circle can be arranged radially separated from the other fields of the field patterns.

The evaluation device 9 is configured to specify an evaluation instant for a measurement signal MS' of at least one further eddy-current sensor 8 based on the evaluation of measurement signals MS of the eddy-current sensor 7 dedicated to the index fields 10. For this purpose, the measurement signals MS of the eddy current sensor 7 can be scanned continuously at a measurement frequency of 200 MHz, for example. However, it is also conceivable for all eddy current sensors 7, 8 to be operated continuously, preferably with the same measurement frequency.

During the rotation of the rolling bearing rings 2, 3 relative to each other, the eddy-current sensor 7 scans the index fields 10. The measurement signal MS fluctuates between a plateau measurement value outside the index fields 10 and various other plateau measurement values that are recorded while the active surface 14 of the sensor 7 is located completely in the field area 13 of the respective index field 10. The other plateau measurement values differ for different field heights T0 to T4.

The evaluation device 9 can be configured to use measurement values of the at least one eddy current sensor 7, 8 recorded outside of field patterns 6 in determining the angular position signal PS in order to compensate for load-dependent deformations of the bearing rings 2, 3.

Figure 2:
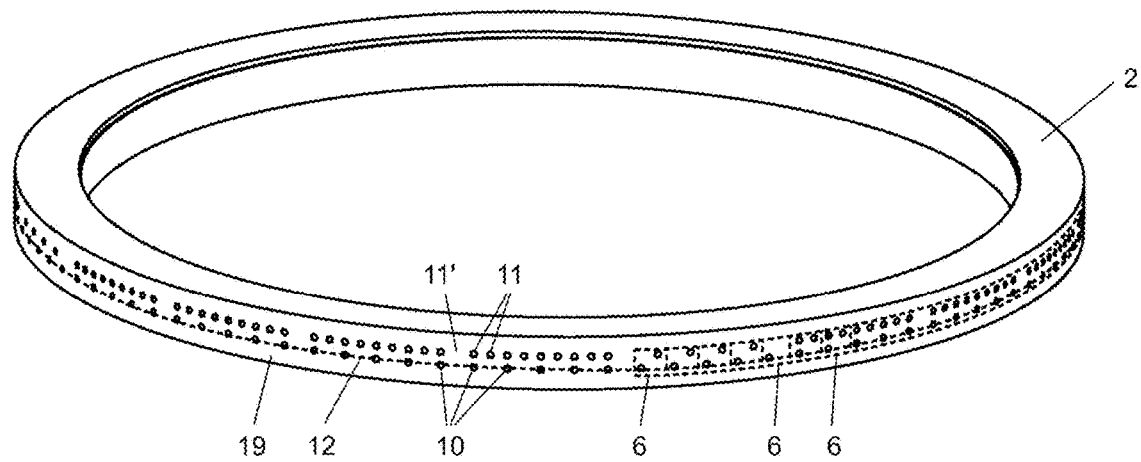
FIG. 2 is a schematic view of a bearing ring of a second exemplary embodiment.

FIG. 2 shows a bearing ring 2 of a second exemplary embodiment of the invention. In contrast to the first exemplary embodiment, the field patterns are arranged on an outer circumference of the ring. In the right half of the picture, the individual field patterns 6 are separated from each other by imaginary dashed lines for better illustration.

As in the first exemplary embodiment, the field patterns each comprise 3 fields. The fields are arranged in an L-shape with an index field 10 in a lower field row and two further fields 11 in an upper field row. The index fields 10 are therefore arranged axially separated from the other fields 11 on an index circle 12. The other fields 11 are also arranged on a circle, which can be referred to as an encoding circle. The index fields 10 each have a field height which is non-zero, while the other fields 11 can also have a field height of zero.

Figure 3:
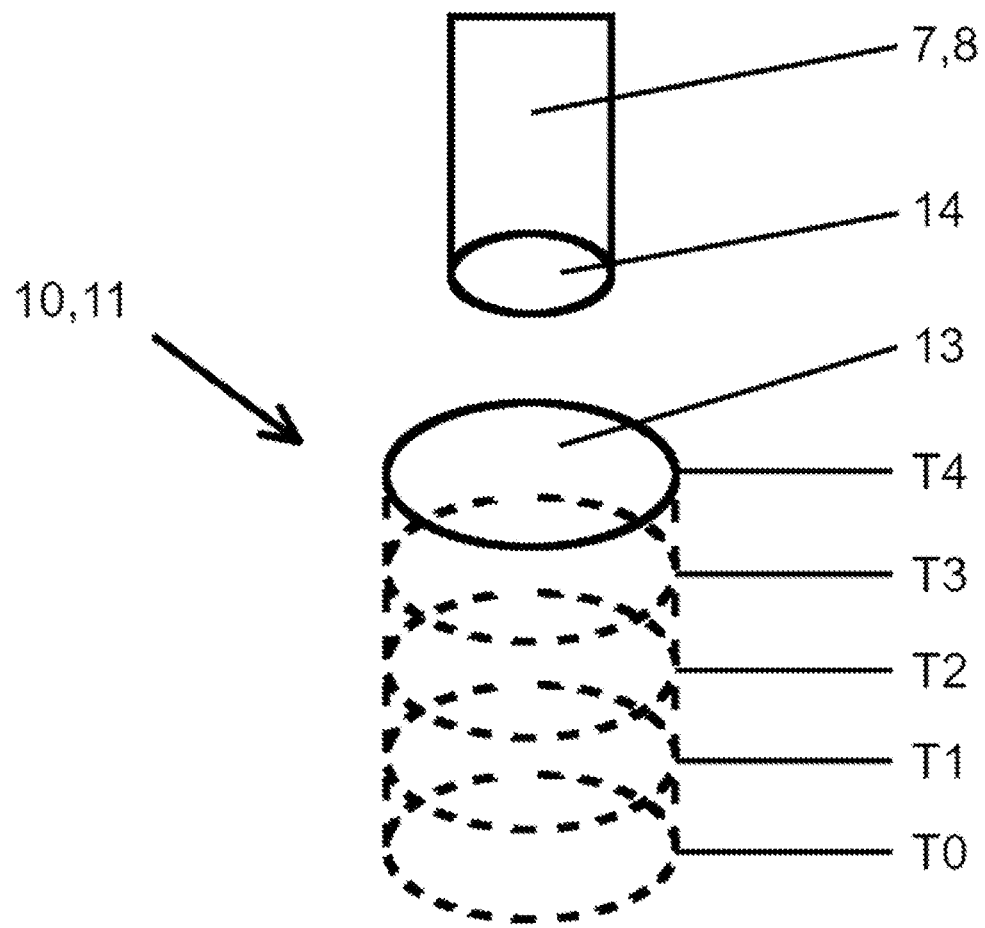
FIG. 3 is a schematic view illustrating scanning of a field by an eddy current sensor.

The example shown in FIG. 2 is based on four discretely different field heights T0, T1, T2, T3 for the index fields 10 and five discretely different field heights T0, T1, T2, T3, T4 for the additional fields 11 (see FIG. 3). This results in $100=5^2 \times 4$ different coding possibilities, so that the position measuring device achieves a resolution of 3.6°. By coding the fields, an angular position signal can be directly assigned which describes the absolute angular position of the bearing rings 2, 3 in relation to each other. This can be carried out, for example, in the manner of a place value system:

$$\text{Angle} = \text{increment} \times (25 \times L1 + 5 \times L2 + L3),$$

where L1, L2 and L3 stand for normalized values of the field heights T0 to T4 of the three fields of the field pattern, which can assume integer values from 0 (maximum depth T0) to 4 (vanishing field height T4), each of which is assigned to a physical field height T0 to T4. For example, the physical (non-normalized) field heights T0 to T4 may differ from one another in equally spaced increments from 0.2 mm to 1 mm.

By cyclically repeating selection of the normalized field height L3=0, 1, 2, 3, 4, 0, 1, . . . of the second field 11 of the upper row, the groups of 5s shown result, because every five field patterns a field pattern with a vanishing field height T4 (L3=4) recurs.

FIG. 3 schematically shows an eddy current sensor 7, 8 during scanning of a field 10, 11 of a field pattern. As illustrated, the fields 10, 11 of the field patterns preferably have field areas 13 that are larger than an active sensor surface 14 of the at least one eddy current sensor 7, 8, so that the active sensor surface 14 is at least temporarily located in the region of the field 10, 11 during the rotation. For example, for a field diameter of approx. 10 mm the eddy current sensor 7, 8 can have an active surface 14 with a diameter of approx. 8 mm.

According to an exemplary embodiment not shown, the field patterns 6 can be formed by at least one metal sheet fixed to the first bearing ring 2. For the remainder, the comments in relation to the previous exemplary embodiments also apply mutatis mutandis.

LIST OF REFERENCE SIGNS 1 rolling bearing
2 first bearing ring
3 second bearing ring
4 rolling element
5 position-determining device
6 field pattern
7 eddy current sensor for index fields
8 eddy current sensor
9 evaluation device
10 index field
11 field 12 index circle
13 field area
14 active sensor surface
15 window section
16 roller spacer
17 sensor
18 mounting hole
19 surface
T0 to T4 field height
MS, MS' measurement signal
PS angular position signal

What is claimed is:

1. A rolling bearing comprising:
bearing rings that are rotatable relative to each other;
a row of rolling elements configured such that the rolling elements can roll between the bearing rings; and
a position-determining device configured to determine an absolute angular position of the bearing rings relative to each other, wherein the position-determining device includes:
  field patterns that are arranged on a surface of a first of the bearing rings and distributed around a circumference of the first bearing ring, wherein fields of the field patterns have field heights with discrete values, wherein each field pattern is a fixed arrangement of a predetermined number of fields in which positions of the fields relative to one another in the field pattern are fixed, and wherein the field patterns differ by the field height provided for each individual field,
  an eddy current sensor on a second of the bearing rings to scan the field patterns, and
  an evaluation device configured to assign an associated angular position signal, which describes the absolute angular position of the first and second bearing rings relative to each other, to a scan of each field pattern.

2. The rolling bearing of claim 1 wherein the field heights of the fields comprise at least one of depressions or elevations on the surface.

3. The rolling bearing of claim 1 wherein at a predefined position each field pattern contains an index field, with the field height at the index field differing from a surrounding surface.

4. The rolling bearing of claim 3 wherein the index fields are arranged on an index circle axially and/or radially separated from the other fields of the field pattern, wherein the eddy current sensor is dedicated to the index fields and is configured to only pass over the index fields as the rolling bearing rings rotate.

5. The rolling bearing of claim 4 wherein the eddy current sensor is a first eddy current sensor, wherein the evaluation device is configured to specify an evaluation instant for a measurement signal of a second eddy current sensor based on an evaluation of measurement signals of the first eddy current sensor assigned to the index fields.

6. The rolling bearing of claim 1 wherein the field heights of the field patterns have at least three discrete values.

7. The rolling bearing of claim 1 wherein the field patterns comprise a predefined number of fields, with each field being assigned exactly one eddy current sensor for scanning.

8. The rolling bearing of claim 1 wherein the fields of the field patterns comprise field areas that are larger than an active sensor surface of the eddy current sensor.

9. The rolling bearing of claim 1 wherein the evaluation device is configured to use measurement values of the eddy current sensor recorded outside of field patterns in determining the angular position signal to compensate for load-dependent deformations of the bearing rings.

10. The rolling bearing of claim 1 wherein the field patterns comprise a metal sheet fixed to the first bearing ring.

* * * * *